April 13, 1954  B. CASTIGLIA  2,674,873
WHEEL TESTER
Filed Sept. 29, 1950
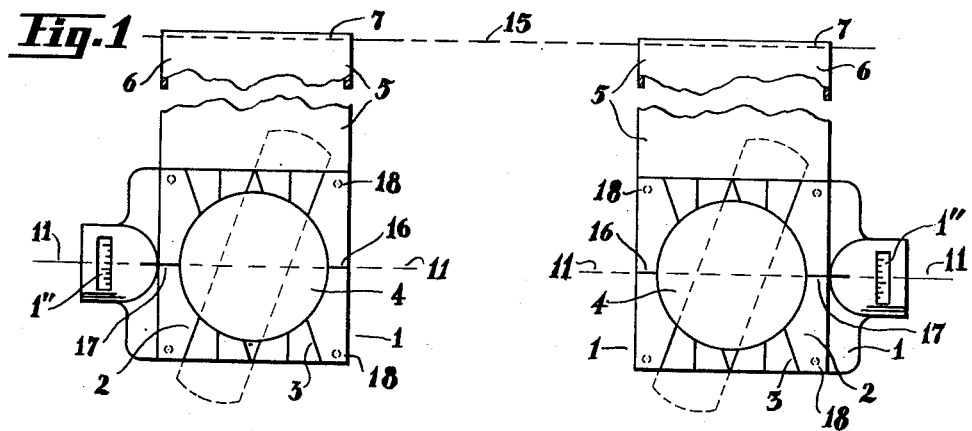
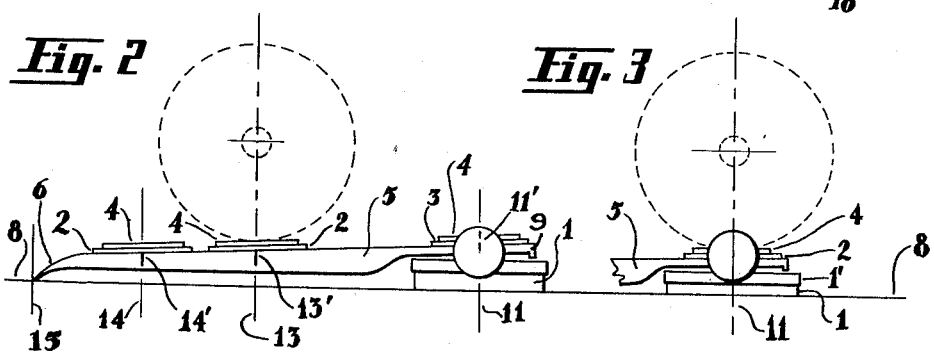
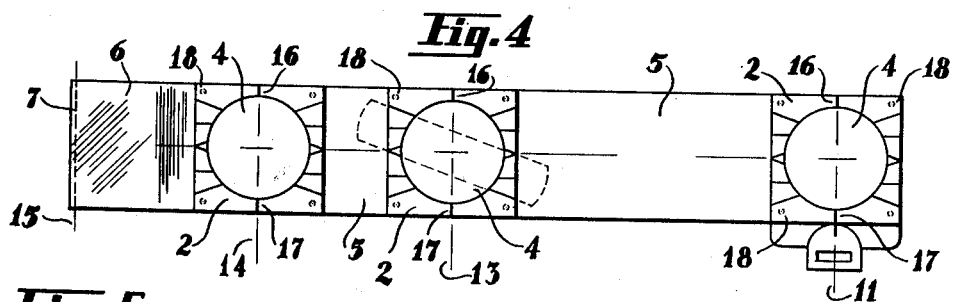
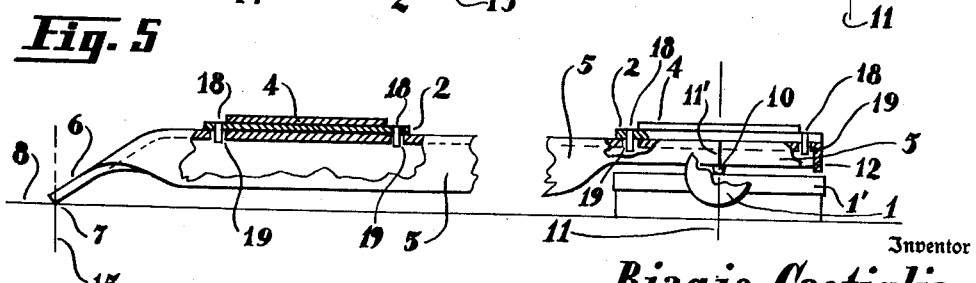
Inventor
*Biagis Castiglia*
Paul A. Talbot
Attorney Patented Apr. 13, 1954

2,674,873

UNITED STATES PATENT OFFICE 2,674,873

WHEEL TESTER

Biagis Castiglia, New York, N. Y., assignor to Wheel Aligning Necessities, Inc., New York, N. Y., a corporation of New York Application September 29, 1950, Serial No. 187,401

5 Claims. (Cl. 73—65)

My invention relates to a wheel tester and particularly to a device for determining the geometric characteristics of independent vehicle wheel suspension as related to steering by means of a scales or the like to register the weight carried by the wheel at relatively different positions as when turned in steering.

Among the purposes and objects are to provide a means for turning the wheel while being weighted.

Another object is to provide a quick and simple means for telling that the wheel needs caster adjustment.

Still another object is to provide an instant wheel check by merely turning the steering wheel of a vehicle so that the operator can see the need for adjusting the caster of the wheel.

An object is to provide a turn table or plate member and on which the wheel may be swung and a scales.

An object is to provide a bridge or track on which the turn-table and plate member is mounted whereby the scales is placed under one end of the bridge or track and/or the position of the member on the track may afford a means of weighing the wheel of either a light or heavy vehicle on the same scales such as a light coupe or heavy truck or so that a scales having a limit of 250 pounds may weigh the weight carried by a wheel amounting to 1000 pounds or any other weight.

I accomplish these and other objects by the construction shown in the accompanying drawing which forms a part of this, my disclosure.

In the drawings:

Fig. 1 is a plan view showing the two front wheels of a vehicle in dotted lines on two scales.

Fig. 2 is an elevational view showing a plurality of any turntable or plate members on my bridge or track.

Fig. 3 is an elevational view of one of my scales shown in Fig. 1.

Fig. 4 is a plan view of my bridge or track shown in Fig. 2.

Fig. 5 is an elevational detail of the ends of my bridge or track.

Similar reference characters refer to similar parts throughout the several views of the drawing and in the specification.

It has been found that a rough or preliminary caster indication may be read on a scales for weighing the load carried by the wheel of an automobile in which the wheel is independently suspended in the usual manner. With a positive caster, the scales show a greater weight when the wheel is turned as for an inside turn than for an outside turn; the corner of the chassis is raised or the supporting spring compressed when the wheel is set for an outside turn. The opposite effect is registered by the reading on the scales when the king pin has a negative caster. Thus the scales registers the caster whether positive or negative and can be calibrated, for a known weight, whether the caster is positive or negative; the amount, however, is relative and for quickly made preliminary tests, is sufficient to tell at once that the particular wheel requires caster adjustment. This can then be done accurately by further tests by any of the well known wheel gauges now commonly used in adjusting the caster of the wheel.

The accurate tests and adjustment for caster require the time of an expert in wheel alignment while the preliminary tests, using the tester herein described, can be made quickly and at no expense to the operator of the vehicle.

I have not attempted to show and describe all possible modifications of my wheel tester but rather have described in detail a preferred embodiment so that one skilled in the art to which this invention pertains may more easily understand the construction and practice its use.

The preciseness of the detailed description and the preciseness of the drawing are not intended to limit the scope of my invention which is set forth in the appended claims.

Referring to the drawings, I have shown a scales such as commonly used for weighing persons and of a low platform type often called bath room scales, the type and construction of the scales however may vary and an entirely different type may be used or modified to indicate the weight which the particular wheel supports and carries in cooperation with the other wheels of the vehicle.

A convenient dial 2, having indicia 3 is placed on the scales platform 1' as a substitute for a wheel turn gauge to show the approximate center and turn positions at each side of the center position, such for instance, as the 20 degree position at each side of the center position as when the wheel is set for a right or left turn in steering the vehicle. In addition to the dial and indicia on the scales platform, I have provided a turntable or plate member 4 on which the wheel may be swung or turned to right or left as above described.

A pair of scales, dial and turn-table members may be provided so that time is saved in testing both front wheels and also to place both wheels on substantially the same plane or level while testing each wheel.

A plurality of members 4, are mounted as shown particularly in Figs. 2, 4 and 5 on a bridge or track 5 having one end 6 with its bearing point 7 resting on the floor 8 and the other 9 and its bearing point 10 resting on the scales 1. One member 4, is positioned on the centerline 11 which is also the centerline of the scales 1 and the centerline of the bearing point 10. A second safety bearing 12, is provided at the extreme end of the track 5 to prevent the end 6 from being raised too far from the floor when the center of the weight on the wheel is between the points 10 and 12 to prevent the track from teetering. Another member 4, together with the dial 2, and indicia 3, is positioned mid distant between the points 7 and 10 on the center line 13 to permit the weight supported by a heavier vehicle to be indicated even though the weight is greater than maximum capacity of the scales; the scales indication in such case is multiplied by two.

For weighing the weight carried by one of the wheels of a vehicle wherein such weight is too great for the member 4, dial 2 and indicia 3, in such case the wheel is positioned on the center line 14, which center line is positioned midway between the center line 13 and the point 7, which is positioned at the end centerline 15.

The center marks 16 and 17 on the dial 2 are provided to spot the wheel and also the dial and member 4 on the center lines 11, 13 or 14 which are placed in coincidence with the marks 11', 13' and 14' on the track 5. Dowels 18 depending downwardly under the dial 2, are provided to hold the dial 2 and member 4 in the desired position on the track 5 by engaging the apertures 19.

I have shown a scales having indicia 1" to designate the weight carried by the wheel when placed directly above the scales. If the wheel is placed on the track one half the distance between the scales and the end resting on the floor the weight designated on said indicia is one half the weight carried by the wheel, if the wheel is placed one tenth the distance from the end resting on the floor in relation to the end resting on the scales the weight shown on the indicia is one tenth the weight carried by the wheel; if the indicia, for instance shows 200 pounds the actual weight carried by the wheel is 2000 pounds.

One of the reasons why the scales shows a difference in weight is because of the following physical changes due to typical independent wheel suspensions common to most motor vehicles and particularly to knee action automobiles. The caster causes any point on the axis of the wheel spindle radially disposed in relation to the king pin to travel on an incline with relation to a level floor and the inclination of the king pin causes the point to travel on an arc, the tangent of which is inclined with relation to the floor. Thus when the wheel is turned, as at 20 degrees from the center position and with a positive caster the point, any point on the spindle axis, is lower in relation to the king pin at the rear end of travel as when the wheel is set or positioned for an inside turn thus causing the king pin to be raised and to compress the suspending spring which increases the weight carried by the wheel as shown by the scales.

If the chassis were rigid and without springs and one corner raised, the entire weight would be placed on two wheels instead of all four wheels; the weight carried by the raised wheel would thus be twice the weight carried, if divided equally on all four wheels.

The materials used and the size of the parts of my wheel tester may vary to suit the uses to which it is adapted.

Having thus described a preferred embodiment of my invention what I claim as new and desire to secure by Letters Patent is set forth in the following claims.

1. A vehicle wheel tester having scales and a track on which one of the front wheels of the vehicle may be rolled, one end of said track resting on the floor and the other end on said scales, a plurality of turn tables spaced apart along said track to permit the wheel, when on any one of said turntables and when turned as when steering to right or left, to indicate on said scales, the wheel characteristics, such as caster.

2. A vehicle wheel tester having scales and a track on which one of the front wheels of the vehicle may be rolled, one end of said track resting on the floor and the other end on said scales, a plurality of turn-tables spaced apart along said track to permit the wheel, when on any one of said turn-tables and when turned as when steering to right or left, to indicate on said scales, the wheel characteristics, such as caster, means on said track to indicate the respective relative position of any one of said turn-tables between the end resting on the floor and the end resting on the scales, whereby a relatively heavy vehicle and its caster and a relatively lighter vehicle and its caster may be indicated on said scales, whereby the scales and its capacity may be exceeded by the weight of the wheel of the heavy vehicle yet said scales may indicate the difference in weight when the wheel is turned as from right to left, said track having a rest at each end for resting on the floor or for resting on the scales.

3. A vehicle wheel tester having scales and a track on which one of the front wheels of the vehicle may be rolled, rests at each end of said track, one end of said track resting on the floor and the other end resting on the scales, a plurality of turntables spaced apart along said track to permit the wheel, when on any one of said turntables and when turned as when steering to right or left, to indicate on said scales the wheel characteristics, such as caster, said turntables each being disposed on a common plane in relation to another.

4. A vehicle wheel tester having scales and a track on which one of the front wheels of the vehicle may be rolled, rests at each end of said track, one end of said track resting on the floor and the other end resting on the scales, a plurality of turntables spaced apart along said track to permit the wheel, when on any one of said turntables and when turned as when steering to right or left, to indicate on said scales the wheel characteristics, such as caster, said track having means for positioning any of said turntables at a predetermined distance from another or from its ends.

5. Apparatus of the kind described comprising a pair of weighing scales adapted to be supported in spaced relation corresponding to the spacing of automobile front wheels, a trackway for each scale having at one end means to rest upon the scale and at the other end means to rest upon the floor, one or more turntables mounted on each track, each turntable adapted to receive the front wheel of the vehicle under test, whereby when the front wheels of the vehicle are on the turntables the wheels may be swung from one side to the other and variations imposed on the scale when the wheels are in one position or another will indicate the difference of caster as to the wheels.

References Cited in the file of this patent

UNITED STATES PATENTS

| Number | Name | Date |
| --- | --- | --- |
| 1,936,178 | Sykes | Nov. 21, 1933 |
| 2,491,117 | Langham | Dec. 13, 1949 |
| 2,503,580 | Fontaine | Apr. 11, 1950 |